L. A. SUBERS.
BAND MAKING MACHINE.
APPLICATION FILED JAN. 12, 1916. RENEWED JULY 26, 1919.
1,332,527.
Patented Mar. 2, 1920.
6 SHEETS—SHEET 1.
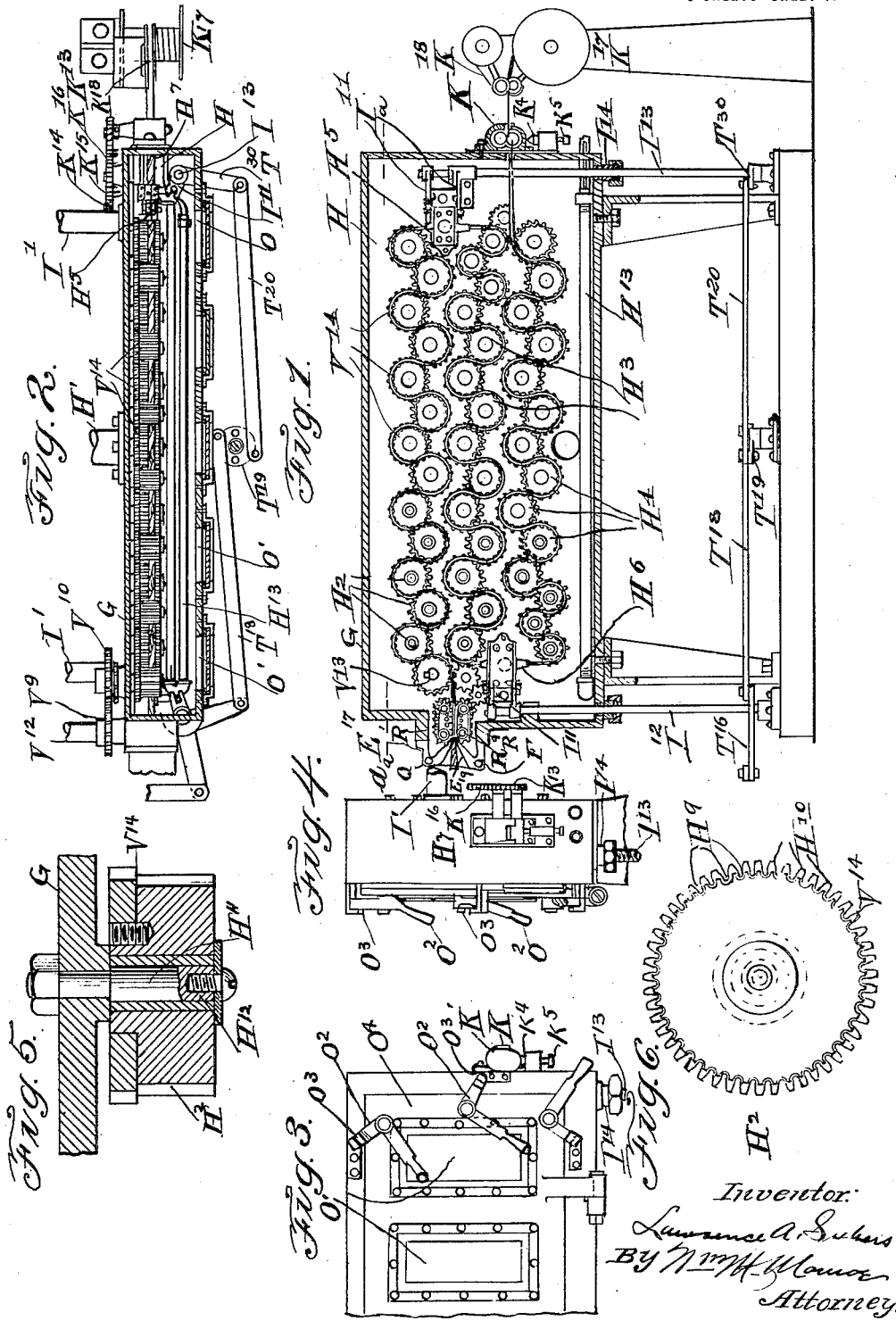

L. A. SUBERS.
BAND MAKING MACHINE.
APPLICATION FILED JAN. 12, 1916. RENEWED JULY 26, 1919.
1,332,527.
Patented Mar. 2, 1920.
6 SHEETS—SHEET 2.
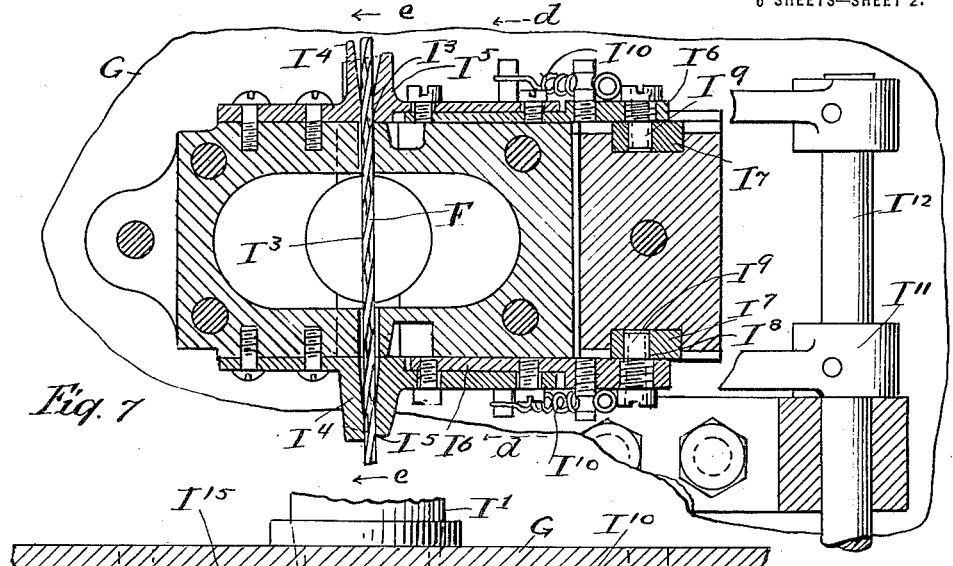
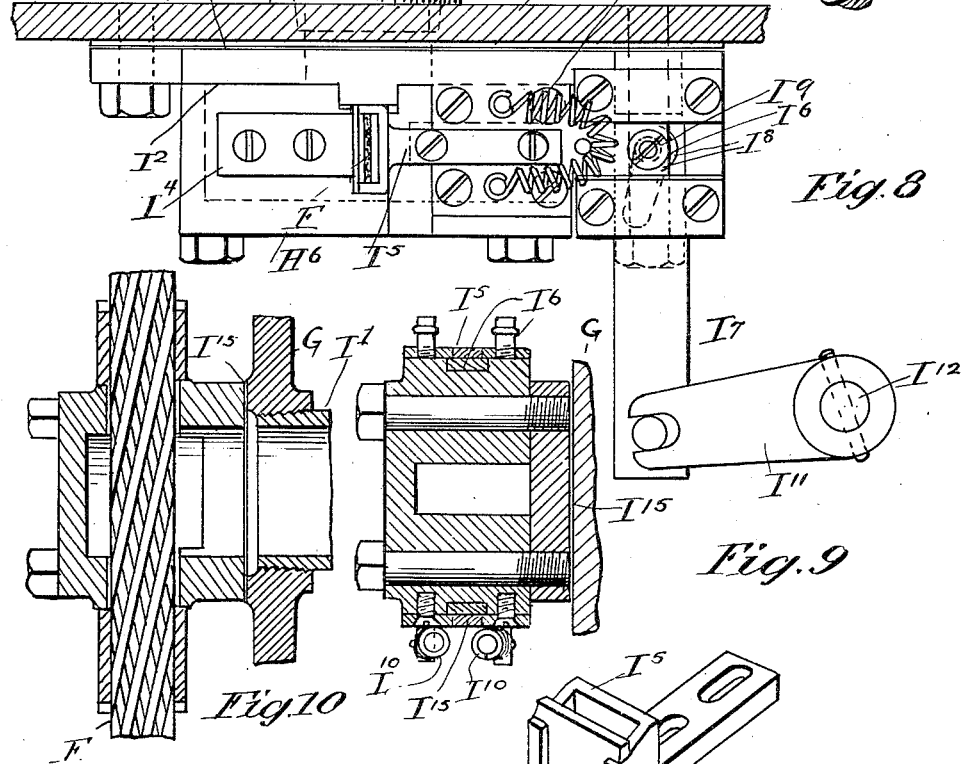

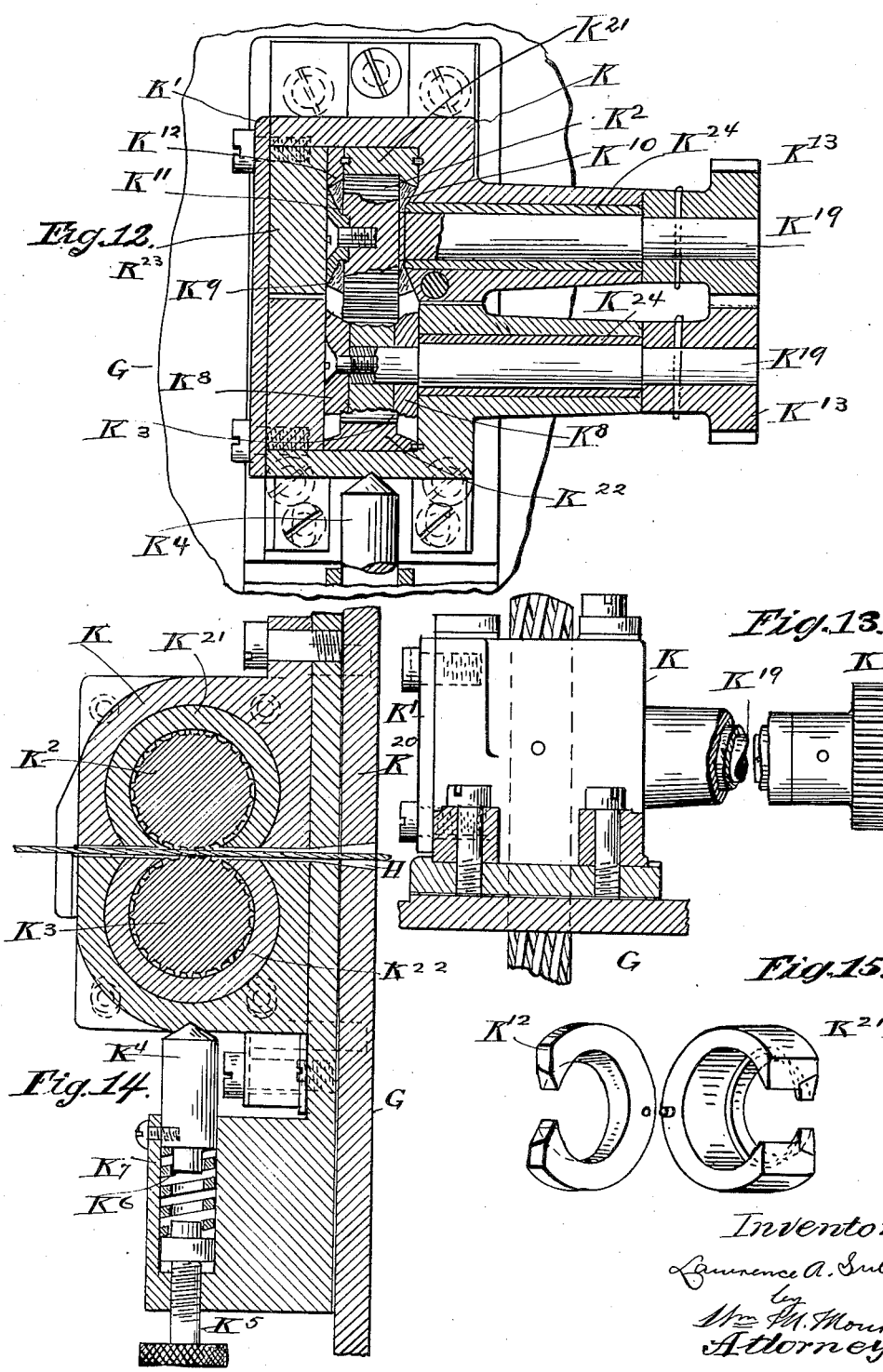

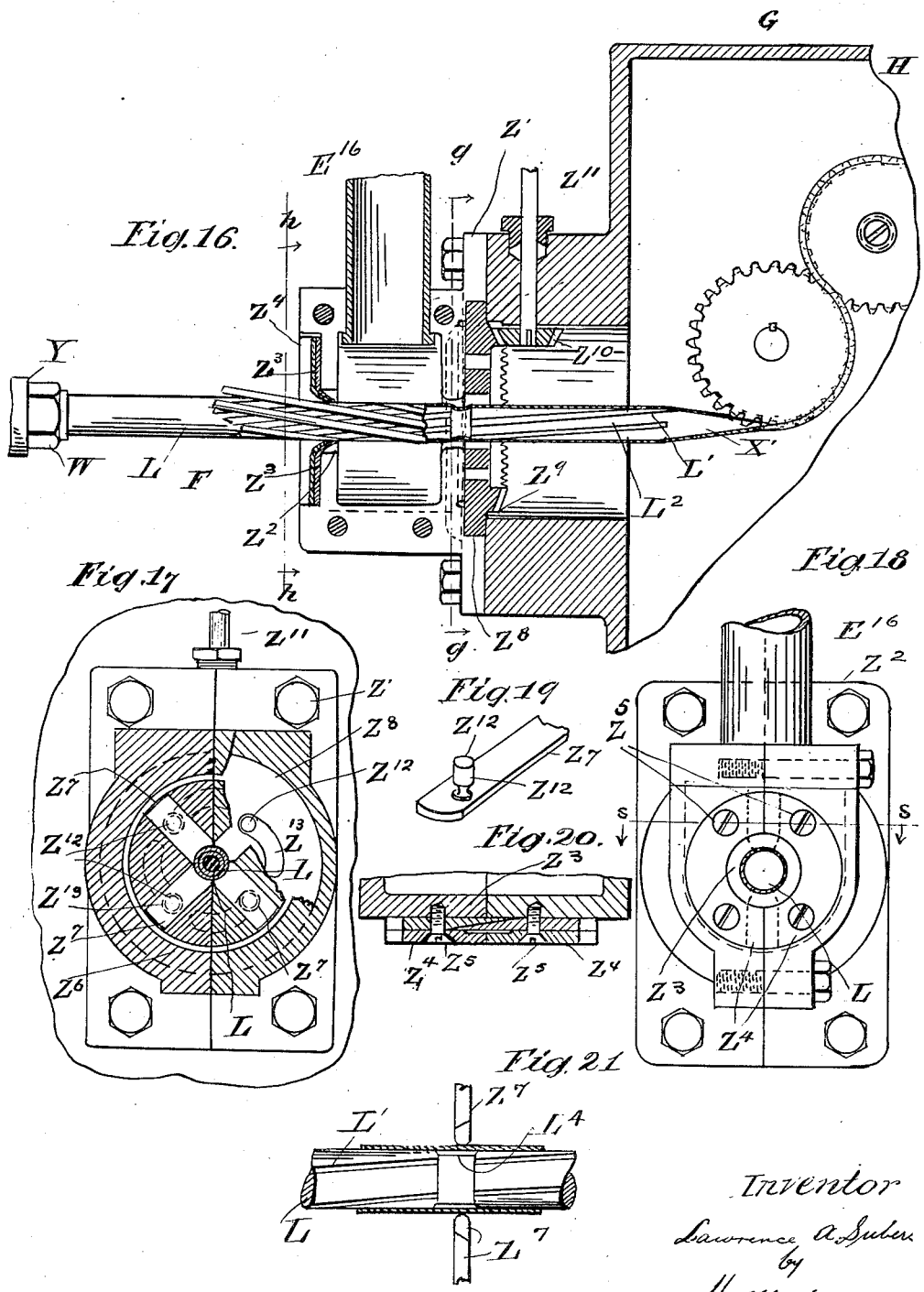

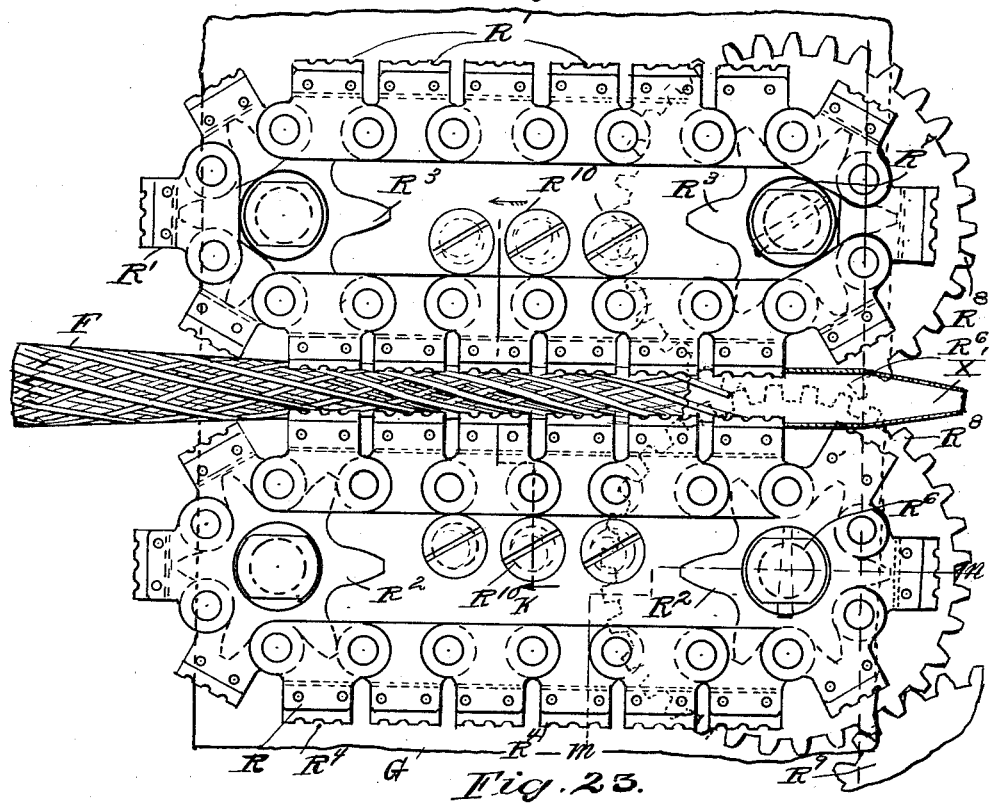
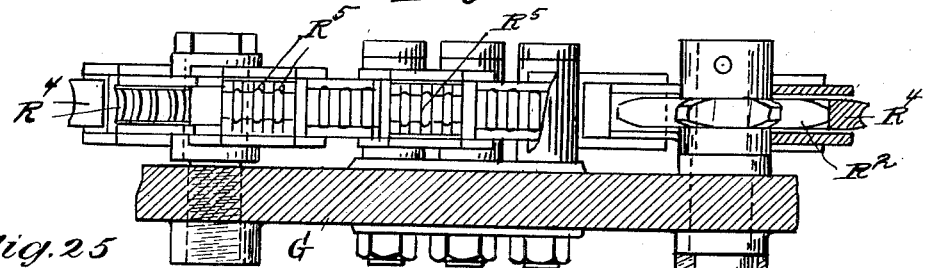
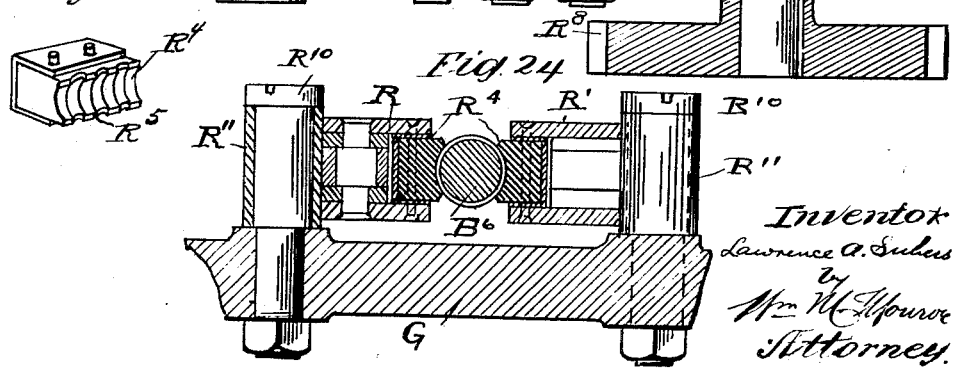

L. A. SUBERS.
BAND MAKING MACHINE.
APPLICATION FILED JAN. 12, 1916. RENEWED JULY 26, 1919.
1,332,527.
Patented Mar. 2, 1920.
6 SHEETS—SHEET 6.
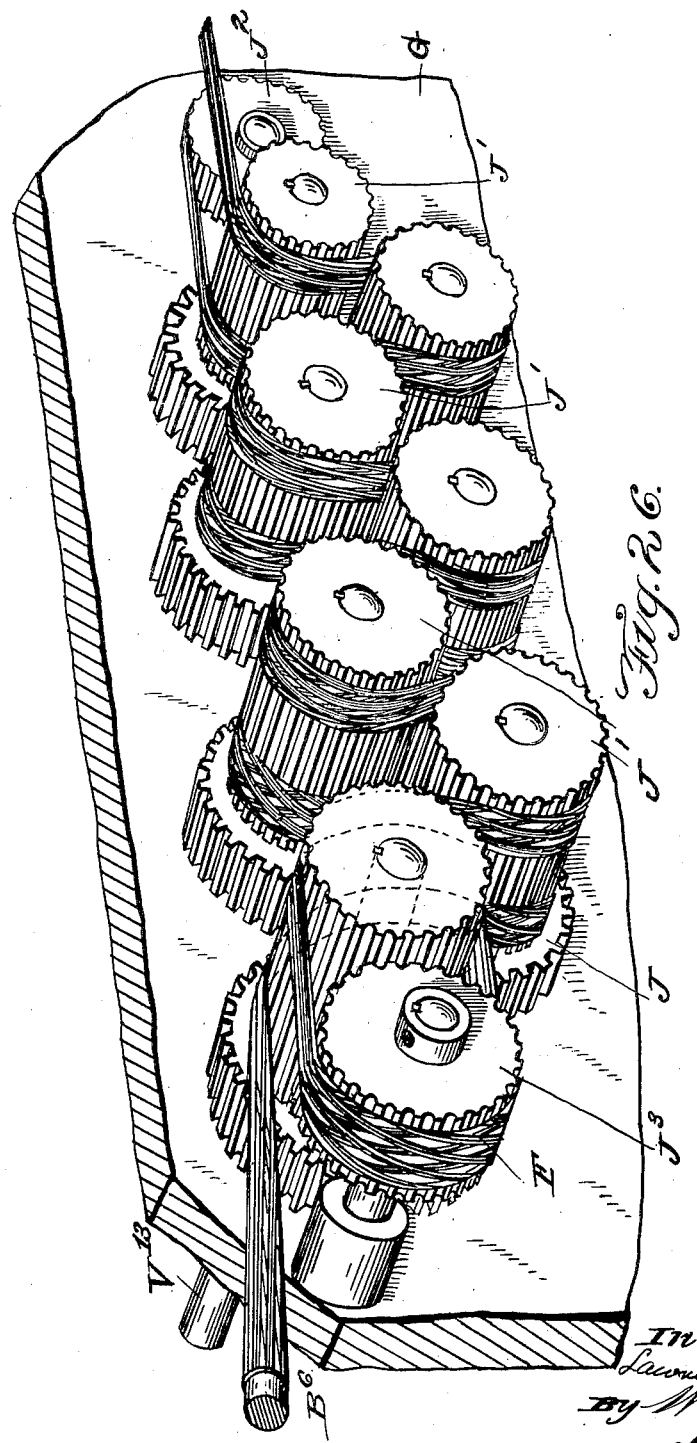

UNITED STATES PATENT OFFICE.

LAWRENCE A. SUBERS, OF LAKEWOOD, OHIO.

BAND-MAKING MACHINE.

1,332,527.  Specification of Letters Patent.  Patented Mar. 2, 1920.

Original application filed December 30, 1911, Serial No. 668,625. Divided and this application filed January 12, 1916, Serial No. 71,708. Renewed July 26, 1919. Serial No. 313,480.

*To all whom it may concern:*

Be it known that I, LAWRENCE A. SUBERS, a citizen of the United States, and resident of Lakewood, in the county of Cuyahoga and State of Ohio, have invented certain new and useful Improvements in Band-Making Machines, of which I hereby declare the following to be a full, clear, and exact description, such as will enable others skilled in the art to which it appertains to make and use the same.

This application consists of a division of my former application bearing Serial No. 668,625, filed December 30th, 1911, for a machine for constructing a laminated-cohesive-interwound fabric band.

The objects of the invention are to provide efficient and practical means for evaporating the solvents and for drying and solidifying the adhesive coating material, such as liquid rubber, used in constructing a laminated-cohesive-interwound fabric band, by the machine described in my former application Serial No. 668,625, and also for applying and solidifying one or more successive coatings of liquid rubber, or other desired material, to the exterior surface of said band.

The machine further embodies elements of improvement in practicability and efficiency over my former devices as described and illustrated in my prior application Serial No. 600,314, filed December 31st, 1910, Serial No. 600,315, filed December 31st, 1910, and Serial No. 634,982, filed June 23, 1911, in which it is shown that the material upon the band is solidified and dried by passing the same over and between rollers having a polished surface placed at some distance apart in a vacuum chamber.

Further objects are to combine with a pulling device for the laminated-cohesive-interwound band, a pushing device, which tends to equalize the forward movement of the band and lessens the tensile strain as the band comes off the forming tube, thereby reducing to a minimum the narrowing of the band and practically eliminating the possibility of the same lapsing into a roped condition.

The shoes which form a part of the pushing off device are also transversely channeled to form open spaces thereon for the exposure of the yarn elements to the vacuum and heat so that the action of eliminating the solvents in the liquid rubber or other adhesive substance, and the drying of the coating thereon will proceed uniformly all around the band.

Further improvements comprise a series of closely arranged compressing and pulling off rolls rotating in a vacuum chamber and adapted to receive the completed band directly one from the other, and to reduce the amount of unsupported surface of the finished band to a minimum, so that it will be practically impossible for the band to become distorted or resume its tubular form while passing to and from the various pulling rolls, such action of the band upon the rolls referred to being necessary owing to the fact that a certain number of lineal feet of the band must be exposed to a certain number of inches of vacuum and a predetermined amount of heat must be produced in the vacuum chamber for the purpose of eliminating the solvents in the liquid rubber. The bands of finished fabric may pass over the rolls in opposite directions so as to reduce the number of rolls and the size of the vacuum chamber necessary to acquire the essential results for the purpose indicated.

Further features of the invention comprise rollers having toothed or fluted surfaces so designed as to engage the finished band at regular intervals, thus leaving the intermediate spaces exposed to the solidifying influence of the vacuum and heat, and so permitting evaporation of the solvents from both sides of the band at one time. The pulling and drying rollers are also preferably formed of aluminum or other substance to which the liquid rubber on the band will not readily adhere. It will be noted that the pushing and pulling devices are inclosed and are a part of the vacuum chamber or conduit from which the air is practically exhausted, and that this chamber or conduit is provided with suitable heating appliances which are necessary in conjunction with a predetermined number of inches of vacuum to hasten the evaporation of the volatile solvents so that the coating on the laminated finished band is solidified and dried before passing out of the vacuum and heat chamber onto a suitable winding device.

The invention also includes mechanical means for applying an exterior coating of vulcanizable liquid rubber or other adhesive material to the band. The series of pulling and drying rolls are so arranged in suitable divisions that the laminated band passes over a large number of rolls prior to putting on an exterior coating, and is then exposed over a second series of rolls prior to putting on a second coating, and is then further exposed to the vacuum and heat upon a third series of rolls before passing out of the end of the chamber. The number of pulling and drying rolls is reduced in proportion to the number of times the band passes over the same rollers in opposite directions.

The laminated finished band emerges from the vacuum chamber through compressing and forming rolls, and means are provided to prevent as far as possible the entrance of air through the latter to the chamber while the band passes to a suitable winding device. Means are also provided for automatically shutting off, when the machine is stopped, or automatically producing, when the machine is started, a flow of rubber or other adhesive material to the coating devices which provide exterior coatings to the laminated band.

The solvents which are evaporated from the coating material on the bands and which are thereby reduced to gaseous form by the action of the vacuum and heat may be allowed to escape from the exhaust of the vacuum pump or may be condensed by the usual method and reclaimed, as may be desired.

The combination of heat, vacuum and the mechanism as described are absolutely essential for the successful coating of a laminated-cohesive-interwound band formed of yarn elements, or other suitable material, with liquid rubber or other adhesive substance, for evaporating the solvents therefrom, and for drying and solidifying this coating, while the various agencies in these operations must act in unison for the purpose designated. It is also essential that the amount of heat and the percentage of vacuum used in the vacuum chamber should be adapted to the coating material selected.

Figure 1 is a longitudinal section of the coating and drying mechanism; Fig. 2 is a horizontal section on line $a$—$a$ Fig. 1; Fig. 3 is a front view of the exterior of a portion of the vacuum or drying chamber; Fig. 4 is an end view thereof; Fig. 5 is a horizontal section through one of the drying rolls and operating gear thereof; Fig. 6 is a face view thereof; Fig. 7 is a vertical central section of the mechanism for giving an outer coating to the laminated band after it has been formed and the coatings of the several elements have been wholly or partially solidified by the action of the vacuum and heat and also shows the automatic means for adjusting and closing the openings through which the band passes and which determine the thickness of the coating; Fig. 8 is a plan view of the same; Fig. 9 is a section on line $d$—$d$ Fig. 7; Fig. 10 is a vertical section on line $e$—$e$ Fig. 7; Fig. 11 is a perspective view of the jaws which form one of the openings through which the band passes into the rubber receptacle shown in Fig. 7; Fig. 12 is a vertical longitudinal section of the fluted driving rollers between which the finished band is compressed as it passes from the vacuum chamber so arranged as to practically prevent the air from being drawn into the chamber by the action of the vacuum therein; Fig. 13 is a plan view of the casing for these rollers; Fig. 14 is a vertical transverse section of these rollers and compressing mechanism therefor; Fig. 15 is a perspective view of the self lubricating or arguto wood bushings in which the rolls rotate; Fig. 16 is a longitudinal vertical section of the mechanism for coating the fabric band while still on the forming tube at the entrance to the vacuum chamber, and for the exclusion of air therefrom; Fig. 17 is a transverse section on line $g$—$g$ Fig. 16, showing the cam slots in the circular cam plate for operating the closures around the forming tube; Fig. 18 is a transverse section on line $h$—$h$ Fig. 16; Fig. 19 is a perspective view of one of the closures which are automatically shut down around the forming tube to keep the rubber from leaking out when the machine stops; Fig. 20 is a transverse section on line $s$—$s$ Fig. 18 of the rubber washers which prevent the liquid rubber from escaping from the rear of the receptacle; Fig. 21 shows an annular depression in the forming tube to receive knots or other obstructions and allow them to pass the closures and thus prevent the yarn elements from breaking; Fig. 22 is a plan view of the sprocket chain mechanism which aids in moving the band along the forming tubes to the combined fluted pulling and drying rolls; Fig. 23 is a section on line $m$—$m$ Fig. 22, viewed from below of the chain mechanism through the center line of the sprocket wheel; Fig. 24 is a transverse section on line $k$—$k$ Fig. 22 showing the rollers on the adjusting eccentric pins which thrust the chain against the band on the forming tube; Fig. 25 is a perspective view of one of the chain blocks.

Fig. 26 shows a perspective view of a modified form of combined pulling and drying rolls in which the fluted rolls are wide enough to receive the passage of the band in three different lines, parallel to each other, passing around inclined rolls at the turning point to give the proper alinement for clearance, the band thus passing over the rolls twice in one direction and once in the opposite direction. This arrangement of the driving rolls exposes a far greater number of lineal feet of laminated band to the action of the vacuum and heat and with a much smaller number of rolls and driving gears therefor, thus greatly reducing the size of the vacuum chamber.

H is a chamber in which a vacuum is produced as nearly perfect as practicable by suction through the tube H'. A head $E^{17}$ closes the inner end of the chamber H and is provided with an opening Q' just large enough to permit the band to pass. In this chamber the solvents in which the rubber coating has been dissolved are evaporated to a predetermined degree. Here also are shown three series of pulling and drying rolls $H^2$, $H^3$ $H^4$ over which the band passes in turn, backward and forward as it is produced from the mandrel, so as to expose as much surface of the band as possible to the evaporating influence of the vacuum and heat in a predetermined space of time.

These rolls in each series are placed closely together in staggered rows so as to leave as little interval between the rollers as practicable, so that the tube is given no opportunity to resume its tubular or rope-like form while being dried. A coil of steam pipe $H^{13}$ or any other suitable heating system, furnishes heat to assist in the evaporation of the solvents from the liquid rubber or other adhesive material used on the laminated band.

The conical wall $E^{19}$ incloses a chamber communicating with the chamber H through the opening Q and hence is subject to the same degree of vacuum as that in the chamber H and serves as a drying or evaporating means for the fabric band on the mandrel.

The rolls $H^2$, $H^3$ and $H^4$ are similarly and uniformly fluted and are concentrically mounted with and attached to spur gears $V^{14}$ which are geared to travel at an absolutely uniform rate of speed. After passing over the first or upper series of rollers $H^2$ to dry the band as it comes from the mandrel it passes through a coating device $H^5$ to provide an exterior coating and thence passes over the second series of rollers $H^3$ for a second drying treatment and passes through a second coating device $H^6$ of the same construction as $H^5$ and thence over the third series of rollers $H^4$ to dry the second coating. After this second coating is dried it passes through an aperture $H^7$ in the end wall of the chamber as a practically perfect flattened band. Each roll is fluted, that is provided with a complete series of transverse channels $H^9$, $H^9$, to provide projecting teeth $H^{10}$ $H^{10}$ which make contact with the band, and the channels $H^9$ permit of the exposure of the engaging side of the band to the vacuum so that both sides of the band will be dried uniformly. The rolls rotate on pins $H^{11}$ and are provided with self lubricating bushings $H^{12}$.

The rolls are preferably formed of aluminum or other practically non-adhesive material so that the band will not stick to them.

This construction is clearly shown in Figs. 5 and 6. The construction of the coating devices $H^5$ and $H^6$ is clearly shown in Figs. 7 to 11 inclusive.

Here I is a chamber inclosing the fluid rubber with which it is supplied through a pipe I'.

The chamber is formed in portions bolted together for convenience and parted at $I^2$ having packing $I^{15}$ to prevent leakage. The band passes through apertures $I^3$, $I^3$ and through valves or jaws $I^4$, $I^5$ respectively; one set of jaws $I^5$, $I^5$ are adjustable by means of the sliding bars $I^6$, $I^6$, and are movable by means of the sliding plate $I^7$, $I^7$, cam slots $I^8$, $I^8$ and pins $I^9$, $I^9$ so that the movable jaws can be simultaneously opened and closed at pleasure.

A spring $I^{10}$ for each jaw $I^5$ permits of a slight backward and resilient movement to prevent injury in case of the formation of lumps of rubber or any inequality in the surface of the band such as may be caused by a knot and the jaws will prevent the escape of the liquid rubber. The bars $I^7$, $I^7$ are operated by the rock arm $I^{11}$ upon a shaft $I^{12}$. All the rubber fluid coating and supplying devices are provided with means for automatically closing the valves or jaws when the machine is stopped to prevent flooding them with fluid rubber which would dry thereon and prevent the use of the machine until they were cleaned, and the same means serves to open them automatically when the machine is started.

In Figs. 22 to 25 inclusive is shown the mechanism for pushing the band off from the mandrel and is employed as an adjunct to the action of the pulling rollers so as to prevent the pulling action from distorting the band and equalizes the movement. Here R and R' are endless chains below and above the mandrel mounted on sprocket wheels $R^2$ and $R^3$ respectively.

Each chain is provided with blocks $R^4$, $R^4$ which are recessed to conform to the shape of the band on the mandrel and are transversely grooved at $R^5$ to permit the vacuum to affect the evaporation of the solvent from the band as it passes along the mandrel or forming tube.

The sprocket wheels are mounted at one end of the device upon shafts $R^6$, $R^7$, which are geared together at $R^8$, $R^8$ and operated by an auxiliary gear $R^9$ actuated by one of the gears which drive one of the pulling rollers.

These chains are vertically adjustable to provide an adjustable pressure on the band by means of eccentric pins $R^{10}$, $R^{10}$, carrying rolls $R^{11}$, $R^{11}$, and attached to the vacuum chamber G.

Means for closing the aperture $H^7$ as the band passes through it and for pulling the band therethrough are shown in Figs. 12 to 15 inclusive.

Here K is a casing provided with a cover K' in which are inclosed the fluted rollers $K^2$, $K^2$, of exactly equal size and between which the band passes to exclude the outer air, and an intervening plate $K^{20}$ is provided between the casing and the wall of the vacuum chamber, and the lower half of the casing is made slightly adjustable on the upper half by means of a spring pressed pin $K^4$, and an adjusting screw $K^5$, which engages the spring $K^6$ confined in an opening $K^7$.

This permits of compressing the laminated band between the rollers to a predetermined amount and thereby fills all the opening between the rolls, square edges being obtained by flanges $K^8$, $K^8$ upon roller $K^3$, while roller $K^2$ fits closely between these flanges.

Roller $K^2$ is provided with felt washers $K^9$ and $K^{10}$, $K^9$ held in place by retaining washer $K^{11}$ and $K^{12}$ confined between the roll $K^2$ and wall of the casing K. These felt washers are elastic and compressible enough to always bear against the flanges $K^8$, $K^8$ thereby excluding air from the chamber G. $K^{24}$, $K^{24}$, are bearing surfaces of arguto wood or similar self lubricating material, which will serve as a lubricant without oil, since any leakage or escape of oil upon the product being produced would be detrimental thereto.

The partial rings $K^{12}$, and $K^{21}$, of arguto or other self lubricating material form a bearing for the roll $K^2$ while another partial ring $K^{22}$ forms a bearing for roll $K^3$; $K^{23}$ $K^{23}$ are blocks which fill the space between the rolls $K^2$ and $K^3$ and the cover K'.

The rollers are provided with shafts $K^{19}$ which extend rearwardly and are provided with intermeshing gears $K^{13}$, $K^{13}$, operated from one of the shafts $K^{14}$ of the interior pulling rollers by means of intermediate gears $K^{15}$, and $K^{16}$.

The completed band is then wound upon a spool $K^{17}$ in connection with an intermediate band of non-adhesive fabric $K^{18}$.

A link $T^{15}$, a bell crank $T^{16}$, and shaft $I^{12}$ operate the rock arms $I^{11}$, $I^{11}$, for the band coating device $H_6$ in the vacuum chamber, and from the shaft $I^{12}$ and arm of the bell crank $T^{16}$, a link $T^{18}$, rock arms $T^{19}$, links $T^{20}$, rock arm $T^{30}$, and shaft $I^{13}$ operate the rock arms $I^{11}$, $I^{11}$, for the band coating device $H^5$ in the vacuum chamber. $V^9$ and $V^{10}$ are external gears for driving the pulling and drying rollers in the vacuum chamber, and $V^{12}$ and $V^{13}$ are shafts therefor.

In Figs. 16 to 21 is shown the entrance to the vacuum chamber as adapted to coat the fabric band as it passes therein. The mandrel L here shown, with the reference letters used, has been previously described and illustrated in my application bearing Serial No. 668,625, of which this is a divisional application and is essential to the formation of the fabric band when being coated in the vacuum chamber described. The spiral grooves L', L' are employed to distribute the liquid rubber over the inner surface of the fabric band.

Here Z is a chamber for fluid rubber, divided in half for removal and access to the interior for cleaning, and has a base Z' by which it is bolted to the end of the vacuum chamber G.

The outer end is provided with an opening $Z^2$ closed by means of overlapping washers $Z^3$ of leather or other flexible material, held in place by a metal washer $Z^4$, divided in half, and screws $Z^5$, and the inner end is closed by the walls $Z^6$ of the chamber containing sliding jaws $Z^7$, $Z^7$, which can be opened or closed by rotating the plate $Z^8$ which is provided with the bevel gear $Z^9$ engaging the gear $Z^{10}$ upon a shaft $Z^{11}$ operated by the belt shifting mechanism so as to automatically close the opening $Z^6$ in the walls of the chamber Z when the machine stops.

The jaws $Z^7$ are operated by pins $Z^{12}$ thereon and cam shaped openings $Z^{13}$ in the rotatable closure $Z^8$ and the jaws slide in the inner end wall $Z^6$ of the chamber Z.

The mandrel L is provided with an annular recess $L^4$ registering with the jaws $Z^7$ so that if a knot or other obstruction must pass the jaws the band can be depressed into the annular recess $L^4$.

In Fig. 26 a modified system of pulling and drying rolls are shown. In this system the roller J attached to the driving shaft $V^{13}$ is formed of treble width as are all the rollers J', J' except those $J^2$ and $J^3$ at the extreme ends which are of single width and are mounted intermediate of the ends of the other rollers, and inclined at the proper angle for the direction of the band on its return path.

The band first passes around the inner ends of the wider rollers, thence around one of the terminal rollers $J^2$, thence around the intermediate portions of the wider rollers, thence around the other terminal roller $J^3$, thence around the outer ends of the wider rollers, and in this manner one series of wide rollers will expose nearly as much of the band as would be exposed on three series of narrow rollers as shown in Fig. 5.

It is obvious that the speeds of the various series of pulling and drying rolls may be varied slightly in regard to each other for purposes of stretching or slacking the laminated band as may be predetermined without departing from the spirit of the invention or scope of the claims.

It is also obvious that the first few pulling rolls adjacent to the forming tube or mandrel may be constructed so as to be slightly expansible, as in case they are adjusted to be slightly smaller in diameter than the series of pulling rolls immediately following, the band will be stretched and narrowed thereby, while if the expansible rolls are adjusted to be slightly larger in diameter than the series of pulling rolls immediately following, the band will be slackened and widened, without departing from the spirit of the invention or scope of the claims.

I do not confine myself to the exact arrangement of the various mechanical parts, provided any modification would be of material advantage in the development and perfection of the machine as outlined by the drawings and specification of this machine, nor do I confine myself to the use of liquid rubber or other liquid adhesive material but may use this rubber or other adhesive material in any other form desired for the purpose indicated.

It is obvious that suitable winding mechanism may be arranged inside the vacuum chamber for storing the finished band thereon, obviating the emergence of the band from the chamber and thereby diminishing the leakage of air into the chamber.

It is also obvious that by winding the finished band on suitable spools or devices in the vacuum chamber the band is protected from dirt, dust, moisture and practically all foreign matter.

Having described the invention what I claim as new and desire to secure by Letters Patent is:

1. The combination with a vacuum and heating chamber, a former projecting therein, coating and guiding devices for band elements projecting into said chamber and rotatable about said former, and band removing devices in said vacuum chamber, said band removing devices having their band engaging surfaces channeled to permit of the action of the vacuum on said coatings.

2. In devices for removing a band from a forming tube and drying the band, a vacuum and heating chamber, a series of closely juxtaposed band flattening and pulling devices in said chamber, said band flattening and pulling devices provided with spaced surfaces for engaging said band and between which said band is exposed to the influence of said vacuum in said chamber.

3. In a band constructing and coating machine, a vacuum chamber, pulling and flattening means for said band in said chamber, said chamber provided with an outlet opening, and corrugated rolls having overlapping edges thereon, over which said band passes, said rolls adapted to compress and shape the sides and edges of said band.

4. In a propelling device for a coated fabric, said device arranged in the wall of a vacuum chamber, the said wall provided with an outlet opening, a pair of longitudinally grooved rollers, a fixed bearing for one roller and a resiliently supported bearing for the other roller, said rollers inclosed in said bearings and arranged to receive the fabric between them as it comes from said opening.

5. In combination, with the wall of a vacuum chamber having an outlet opening, a pair of rollers adapted to pull a coated fabric through said opening and to form a closure therefor, a fixed bearing for one roller, and a resilient bearing for the other roller, said rollers constructed to overlap at their outer edges to preserve a uniform width and thickness in said band, and said rollers inclosed in said bearings.

6. In a drying device for a coated band, a series of fluted rolls over which said band is passed, the spaces between the flutes upon said rolls permitting evaporation of solvents in said coating, and a vacuum chamber surrounding said series of rolls.

7. In a drying device for a coated band, series of parallel fluted rolls over which said band is passed, intermeshing gears operatively connecting said rolls and individually secured thereto, and a vacuum chamber in which said series of rolls is mounted.

8. In a drying device for a coated band, a series of fluted rolls over which said band is passed, the spaces between the flutes upon said rolls permitting evaporation of solvents in said coating, a mandrel on which said band is constructed, and a band propelling device intermediate of said mandrel and rolls.

9. In a band coating and drying apparatus, a vacuum chamber, and a series of fluted aluminum rolls in said chamber over which the band passes.

10. In a band coating and drying apparatus, a series of fluted rolls over which the band passes, and an inclined roll for receiving the band and reversing its direction to pass it again on to said series.

In testimony whereof, I hereunto set my hand this 30th day of November, 1915.

LAWRENCE A. SUBERS.

In presence of—
S. L. EXLINE,
A. T. OSBORN.